US011905759B2

(12) United States Patent
Morris

(10) Patent No.: US 11,905,759 B2
(45) Date of Patent: Feb. 20, 2024

(54) ANCHORING A CANTILEVERED STEP TO A FIBERGLASS UTILITY POLE

(71) Applicant: INWESCO INCORPORATED, Azusa, CA (US)

(72) Inventor: David L. Morris, Azusa, CA (US)

(73) Assignee: Oldcastle Infrastructure, Inc., Atlanta, GA (US)

( * ) Notice: Subject to any disclaimer, the term of this patent is extended or adjusted under 35 U.S.C. 154(b) by 609 days.

(21) Appl. No.: 16/813,603

(22) Filed: Mar. 9, 2020

(65) Prior Publication Data

US 2021/0277717 A1 Sep. 9, 2021

(51) Int. Cl.

| | |
|---|---|
| ***E06C 1/34*** | (2006.01) |
| ***E06C 7/50*** | (2006.01) |
| ***E06C 7/08*** | (2006.01) |
| ***E04H 12/02*** | (2006.01) |

(52) U.S. Cl.
CPC .................. *E06C 1/34* (2013.01); *E06C 7/50* (2013.01); *E04H 12/02* (2013.01); *E06C 7/081* (2013.01)

(58) Field of Classification Search
CPC ... E06C 1/34; E06C 7/50; E06C 7/081; E06C 9/04; E04H 12/02
See application file for complete search history.

(56) References Cited

U.S. PATENT DOCUMENTS 4,792,016 A * 12/1988 Ingalsbe .................. E06C 1/34 182/93
4,946,004 A * 8/1990 Henson .................... E06C 1/34 182/206
5,460,240 A * 10/1995 Jones ...................... E06C 7/16 182/116
5,941,485 A * 8/1999 Davidson ................ E04H 12/08 411/340
6,151,860 A * 11/2000 Reisdorff ................ E04H 12/34 52/170
6,164,609 A * 12/2000 Eslambolchi ............ H02G 7/02 254/134.3 PA
6,167,988 B1 * 1/2001 Frodge .................... E06C 1/34 182/206
6,378,822 B1 * 4/2002 Franks .................... E06C 1/34 182/92
6,484,982 B1 * 11/2002 Barry ...................... E06C 9/04 248/220.21
6,491,272 B1 * 12/2002 Franks .................... E06C 9/04 248/231.9
6,595,323 B2 * 7/2003 Lindsey .................. E06C 9/04 182/92

(Continued)

*Primary Examiner* — Rodney Mintz
(74) *Attorney, Agent, or Firm* — Michael A. Long; Long & Associates

(57) ABSTRACT

A pole step apparatus for fiberglass utility poles can have a supporting body is disclosed, having a bended portion with a brace on the supporting body; a grip surface distal to the bended portion; a nut on a threaded portion of the supporting body to tighten the brace toward the bended portion via the threaded portion of the supporting body; a passthrough in the brace formed can accommodate a supporting body and resists rotation; the bended portion is formed on the supporting body at a 90-degree angle; an arc is formed on the brace adjacent to the bended portion; and the brace resists rotation via a non-cylindrical, anti-rotational portion of the supporting body.

10 Claims, 3 Drawing Sheets

(56) References Cited

U.S. PATENT DOCUMENTS

| | | | | | |
|---|---|---|---|---|---|
| 7,575,097 | B2 * | 8/2009 | Sheridan | E06C 7/482 182/206 |
| D655,597 | S * | 3/2012 | Matzek | D8/380 |
| 9,593,531 | B2 * | 3/2017 | Ballard | E06C 7/48 |
| D805,658 | S * | 12/2017 | Sailer | D25/69 |
| D828,931 | S * | 9/2018 | Sailer | D25/69 |
| D828,932 | S * | 9/2018 | Sailer | D25/69 |
| 10,112,078 | B1 * | 10/2018 | Sailer | A63B 27/00 |
| D844,179 | S * | 3/2019 | Sailer | D25/69 |
| 10,954,717 | B2 * | 3/2021 | Sailer | E06C 7/18 |
| 11,332,901 | B1 * | 5/2022 | Eckerman | E06C 9/04 |
| 2002/0066620 | A1 * | 6/2002 | Lindsey | E06C 9/04 182/92 |
| 2016/0096045 | A1 * | 4/2016 | Sailer | E06C 7/18 411/366.1 |
| 2016/0096046 | A1 * | 4/2016 | Sailer | A62B 35/0068 411/366.1 |
| 2016/0375282 | A1 * | 12/2016 | Sailer | E06C 7/18 182/90 |
| 2019/0136539 | A1 * | 5/2019 | Davis | E04F 11/0223 |
| 2020/0048964 | A1 * | 2/2020 | Sailer | E06C 7/18 |
| 2022/0074267 | A1 * | 3/2022 | Albertyn | E06C 1/34 |

* cited by examiner

ANCHORING A CANTILEVERED STEP TO A FIBERGLASS UTILITY POLE

BACKGROUND OF THE INVENTION

1. Field of Invention

The present invention is directed to utility poles, in particular, stair or ladder systems used with utility poles.

2. Description of the Related Art

Traditional wooden utility poles are known. Traditional methods to embed stepladder rungs to wooden utility poles are known. However, teachings in the related art fail to attach to modern utility poles made of fiberglass.

Known in the related art are: U.S. Pat. Nos. 9,593,531; 7,575,097; 6,167,988; 6,164,609; 6,151,860; 5,460,240; 4,946,004; and 4,792,016. However, none of the foregoing references in the related art, alone or in combination, suitably solve the problem of embedding stepladder attachments to a modern utility pole which is made of fiberglass material.

In recent years, fiberglass utility poles have started to become used in the related art. Traditional attachment methods are not easily usable with new fiberglass utility poles. Fiberglass utility poles are comparatively much more recent in the related art, compared to conventional wooden or metal poles.

Based on the limitations in the related art, it can be seen there is a need for a device and method to attach a step rung to a modern fiberglass utility pole. It can also be seen that there is a need for a device and method capable of inserting and attaching to a fiberglass pole. It can also be seen that there is a need for a device and method which provides an intuitive directional orientation indicator to properly tighten the bracket.

SUMMARY OF THE PRESENT INVENTION

The present invention seeks to resolve the shortcomings of conventional utility pole step attachments as explained in the prior background section. This will be accomplished with the change and addition of certain features.

A step apparatus for fiberglass utility poles is disclosed. Said pole step apparatus can have a supporting body with a bended portion with a brace on the supporting body; a grip surface distal to the bended portion; a nut on a threaded portion of the supporting body to tighten the brace toward the bended portion via the threaded portion of the supporting body; a passthrough in the brace formed can accommodate a supporting body and resists rotation; the bended portion is formed on the supporting body at a 90-degree angle; an arc is formed on the brace adjacent to the bended portion; and the brace resists rotation via a non-cylindrical, anti-rotational portion of the supporting body.

An aspect of the present invention is to provide a method to attach one step or a series of steps to a fiberglass pole.

Another aspect of the present invention is to overcome limitations of conventional methods of attaching a step or rung to a wooden utility pole, which fail to attach to a fiberglass utility pole.

Yet another aspect of the present invention is to provide a fitted brace and support to secure a supporting footstep using a hole in the surface of a hollowed, curved fiberglass pole.

BRIEF DESCRIPTION OF THE DRAWINGS

Non-limiting exemplary embodiments are provided in the drawings as follows.

DETAILED DESCRIPTION OF THE INVENTION

Figure 1:
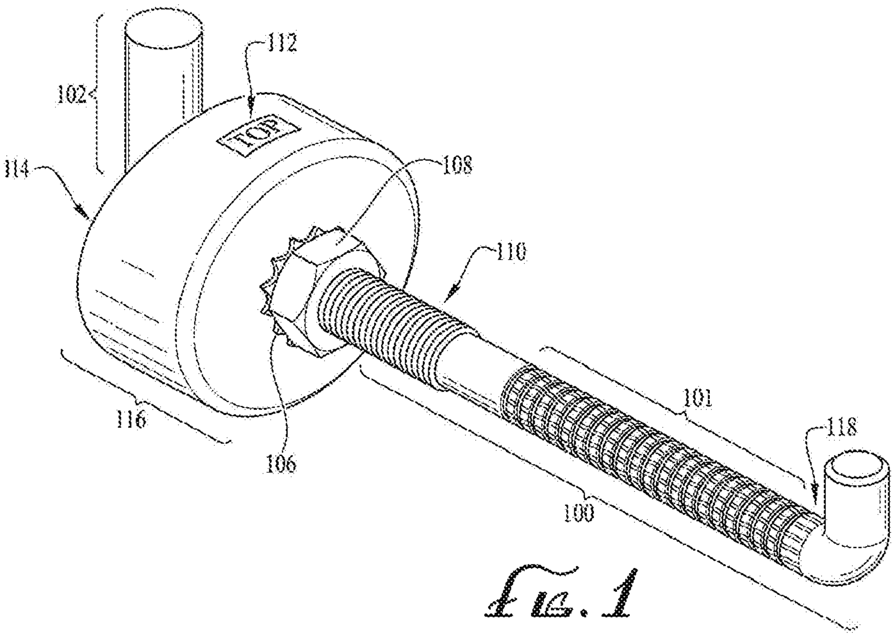
FIG. 1 is an exemplary overall view of the present invention.

In the following description of the preferred embodiments, reference is made to the accompanying drawings that form a part hereof, in which is shown by way of illustration specific embodiments in which the invention may be practiced. It is to be understood that other embodiments may be utilized and structural changes may be made without departing from the scope of the present invention.

References throughout the specification to "interesting embodiment"; "possible embodiment"; "preferred embodiment"; "some embodiments"; "an embodiment"; and like reference to "embodiment" are non-limiting examples to aid in understanding the present invention. An "embodiment" provides that there can be one or more embodiments that can involve the given element or aspect of the invention. Thus, multiple instances of "an embodiment" and like reference do not necessarily refer to the same embodiment.

This specification provides for specific meanings with respect to the present invention, the meanings of which shall be understood as follows:

"Distal" when used in connection with supporting body 100 can refer to a direction away from non-cylindrical, anti-rotational portion 103 or away from bended portion 102 of supporting body 100.

"Top" when used in connection with orientation indicator 112, arc 114 or brace 116 can generally refer to an uppermost direction and is a term of convenience, not absolute. The term "top" is not intended to limit the scope of the present invention.

The drawing figures provided herewith are non-limiting examples, not to be narrowly construed in light of the entire specification which can provide for significant variations consistent with the teaching herein to obtain benefits as claim, including to attach a supporting body to a fiberglass pole.

With reference to the FIGS. 1-7, a pole step apparatus for fiberglass utility poles can be made with supporting body 100 having bended portion 102.

FIG. 1 shows an exemplary overall view of the present invention. Supporting body 100 is shown in FIG. 1 with grip surface 101, bended portion 102, washer 106, nut 108, threaded portion 110, orientation indicator 112, arc 114, brace 116 and thickened portion 118.

Figure 2:
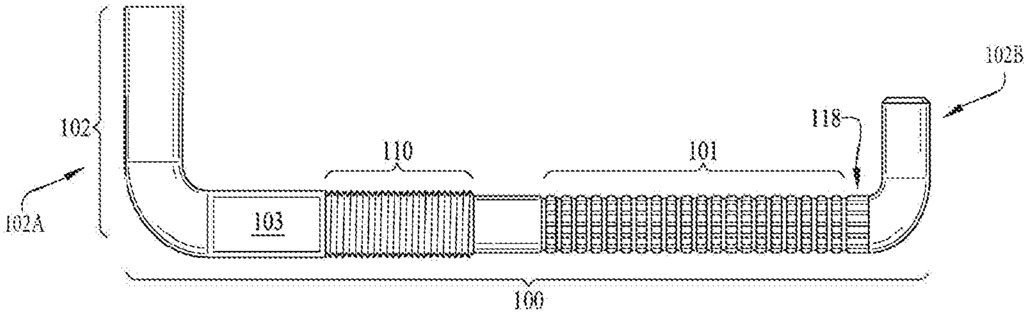
FIG. 2 is an exemplary overall view of the present invention showing supporting body with bended portion without brace.

FIG. 2 shows an exemplary overall view of the present invention with supporting body 100; bended portion 102 adjacent to non-cylindrical, anti-rotational portion 103; anti-rotational portion 103 which can fit brace 116 (not shown in FIG. 2); grip surface 101 adjacent to threaded portion 110; grip surface 101 on supporting body 100 at a distal end away from anti-rotational portion 103; and thickened portion 118 on supporting body 100 adjacent to grip surface. Along supporting body 100 there can be an unthreaded and non-grip portion between threaded portion 110 and grip surface 101. The elements on supporting body can be interchangeable.

Figure 3:
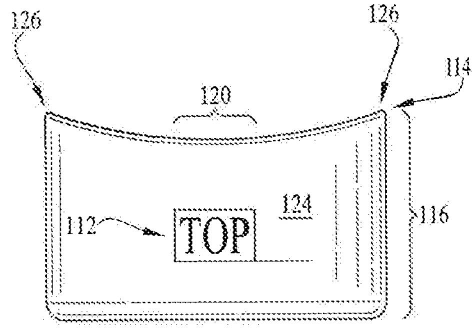
FIG. 3 is an exemplary upper view of the brace of the present invention with orientation indicator.

FIG. 3 is an exemplary upper view of the brace of the present invention with orientation indicator. Orientation indicator 112 is shown in FIG. 3 with arc 114, brace 116, outer wall 124 forming brace 116. An interesting location of passthrough 120 is also indicated in FIG. 3.

Figure 4:
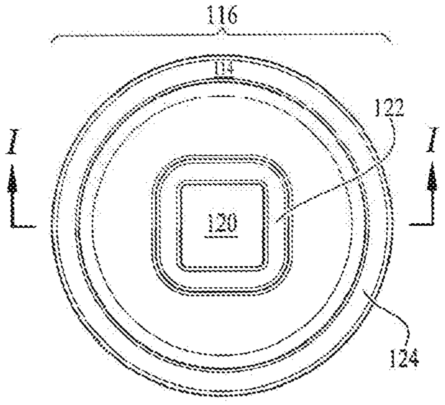
FIG. 4 is an exemplary inner view of the brace of the present invention with exemplary inner wall forming a passthrough and outer wall.

FIG. 4 is an exemplary inner view of the brace 116 of the present invention with exemplary inner wall 122 forming passthrough 120 and outer wall 124. Arc 114 is shown in FIG. 4 with brace 116, passthrough 120 formed by inner wall 122, outer wall 124. An interesting embodiment is shown in cross-sectional view in FIG. 6 with reference to FIG. 4 and reference numeral "I" (FIG. 4).

Figure 5:
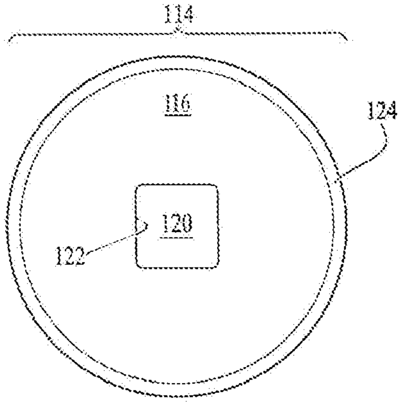
FIG. 5 is an exemplary outer view of the brace of the present invention with passthrough formed by inner wall.

FIG. 5 is an exemplary outer view. Arc 114 is shown in FIG. 5 with brace 116, passthrough 120 formed by inner wall 122 and outer wall 124.

Figure 6:
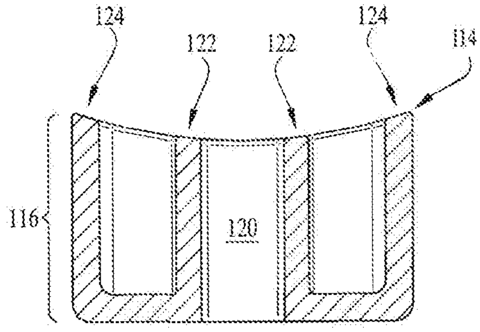
FIG. 6 is an exemplary cross-sectional view of the brace of the present invention showing an exemplary configuration of passthrough formed by inner wall.

FIG. 6 is an exemplary cross-sectional view of the present invention. Arc 114 is shown in FIG. 6 with brace 116, passthrough 120, inner wall 122 and outer wall 124.

Figure 7:
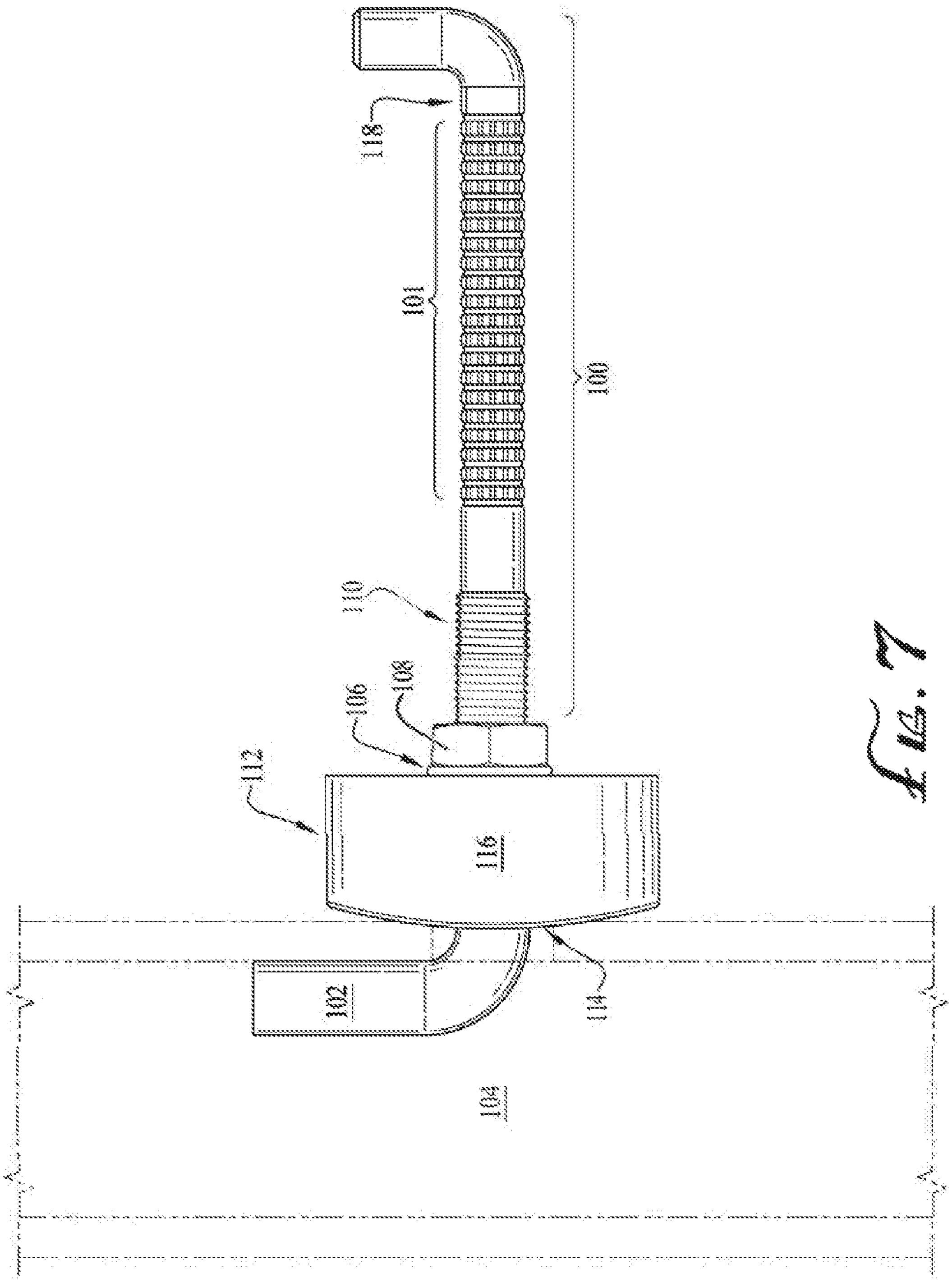
FIG. 7 is an exemplary overall view of the present invention showing brace and supporting body fitted to an exemplary pole.

FIG. 7 is an exemplary overall view of the present invention showing brace and supporting body fitted to an exemplary pole. Supporting body 100 is shown in FIG. 7 with grip surface 101, bended portion 102 inserted through an opening in pole 104, washer 106, nut 108, threaded portion 110, orientation indicator 112, arc 114, brace 116 and thickened portion 118.

Supporting body 100 can be elongated, preferably greater than six inches. Supporting body 100 can provide a grip surface 101. Supporting body 100 can provide a knurled surface distal from bended portion 102. Supporting body 100 further comprises a thickened portion having a thickness greater than the inner opening of nut 108. Supporting body 100 can have a non-smooth surface 101 on bended portion 102. A benefit of supporting body is to provide insert, locking via bended portion 102, and step functions. In an interesting embodiment, supporting body 100 can be elongated at more than 9 inches. Supporting body 100 can be made of any rigid material, preferably made of metal, such as stainless steel.

Grip surface 101 can be, for example, knurled, peened, shurgrip, coated, sleeved, sealed, striated, or any otherwise modified portion on bended portion 102. A benefit of grip surface 101 can be to provide friction such that a footstep or hand placed thereon can have grip.

Bended portion 102 can be configured to be insertable in pole 104. Bended portion 102 can be formed on supporting body at a 90-degree angle. Bended portion 102 can be substantially parallel to washer 106. Bended portion 102 can be configured to tighten upon an inner diameter of pole 104. In an interesting embodiment, there can be first bended portion 102A (FIG. 2); and second bended portion 102B (FIG. 2) formed distally on an opposing end of supporting body 100. Bended portion 102 can configured to create resistance from inside pole 104 against brace 116. In an interesting embodiment, bended portion 102 can be inserted into an opening in fiberglass pole 104 (FIG. 7) such that arc 114 of brace 116 fits to pole 104.

Anti-rotational portion 103 can be formed with supporting body 100. Anti-rotational portion 103 can be non-cylindrical. Anti-rotational portion 103 can be any shape to reduce or halt rotation of brace 116 as fitted with the shape of passthrough 120. Anti-rotational portion 103 can have a corner or protrusion that functionally resists torque. An interesting embodiment can provide anti-rotational portion 103 as a block with at least three sides, preferably four sides, formation on supporting body 100. As used in this specification, the term "rectangular" or in reference to a "block" can include unequal sides and can also include equal sides, meaning that a square is also a form of rectangle. A rectangular shape can facilitate insertion of supporting body 100 into passthrough 120 of brace 116. Passthrough 120 can be formed in substantially the same shape to accommodate anti-rotational portion 103. Anti-rotational portion 103 need not be formed as a block and be any shape, curved, oval, jagged, or any other shape that can facilitate sliding and against twisting of brace 116. A benefit of anti-rotational portion 103 is to prevent twisting of brace 116 when force via nut 108 is applied to tighten brace 116. A further benefit is same can be to preclude twisting of the present invention off the surface of pole 104. The opening of passthrough 120 limits nut 108 from passing through in order to permit nut 108 to tighten brace 116. This can be facilitated by washer 106 between nut 108 and brace 116. In an interesting embodiment, brace 116 and supporting body 100 can be fitted to resist rotation of brace 116 on supporting body 100 by coupling the non-cylindrical, anti-rotational portion 103 of supporting body 100 with inner wall 122 of passthrough 120.

Pole 104 (FIG. 7) can be a telephone pole, particularly one made of fiberglass. Pole 104 can be associated with a method of the present invention. Pole 104 can be hollow inside. An opening can be drilled into pole 104 prior to inserting supporting body 100, via its bended portion 102, into said opening in pole 104 to arrange the present invention partially within pole 104 such that brace 116 is tightened against pole 104 and bended portion. An opposing vice can be formed between brace 116 and bended portion 102. Arc 114 can be the surface of brace 116 pressed against the outer circumference of pole 104 oppose bended portion which is pressing from inside pole 104. A benefit of the present invention is to provide such means which are not common with conventional wooden poles which may not have a hollowed opening. A benefit of the present invention is to permit attachment of steps to fiberglass in such a way that is not presently possible using conventional means, such as to a wooden pole. Therefore, references in wooden or metal pole attachments are not suitable to solving the problems of attaching to a fiberglass pole as achieved by the present invention. An interesting embodiment of pole 104 is shown in FIG. 7. Pole 104 can have an outer diameter for brace 116 to fit via arc 114.

Washer 106 on supporting body 100 can be near bended portion 102. Nut 108 can be on supporting body 100. Washer 106 can be tightened with bended portion 102 via nut 108. Washer 106 can be made of stainless steel. Washer 106 can be next to nut 108 on threaded portion 102 on supporting body 100.

Nut 108 can be on a threaded portion 110 of supporting body 100. Nut 108 can be on one side of washer 106. Nut 108 can be on threaded portion 110. Nut 108 can be configured to rotatably tighten brace 116 toward bended portion 102 via threaded portion 110. A benefit of nut 108 can be to tighten brace and bended portion onto the inner and outer surfaces of the wall of hollow pole 104; thereby facilitating anchoring of supporting body 100 overall as shown in FIG. 7.

Threaded portion 110 can be formed on supporting body 100. Threaded portion 110 can have washer 106 thereon, such that nut 108 tightens on threaded portion 110 against washer 106 and against brace 116 while brace 116 is on anti-rotational portion 103 of supporting body 100. Thereby, nut 108 may be turned and tightened along threaded portion while brace 116 can resist rotation while tightening nut 108. In a possible embodiment, between the locations of grip surface 101 and threaded portion 110 on supporting body, there can be both an absence threaded portion 110 and an absence of grip surface 101.

Orientation indicator 112 can indicate a direction selected from at least one of the following: "top"; "bottom"; "left"; "right"; "up"; "down"; or "this side up." In an interesting embodiment, orientation indicator 112 can be on a supporting body. In another embodiment, orientation indicator can be on brace 116. Orientation indicator can be affixed to display upon brace 116. In an interesting embodiment, orientation indicator 112 can be placed on brace such that arc 114 formed by brace 116 is visible.

Arc 114 can be concave and formed with brace 116 to fit with the curvature of pole 104. Arc 114 can be formed on an open end of brace 116 with bended portion 102 such that supporting body 100 can be formed with bended portion 102. Arc 114 can extend around bended portion such that two opposing curved ends 126 (FIG. 3) of arc 114 can be configured to be fitted to an outer surface of pole 104. Arc 114 can have curved ends 126 extending past the plane of bended portion 102. An interesting embodiment of arc 114 is shown in FIGS. 1, 3, 4, 5, 6 and 7. A benefit of arc 114 can be to provide a curved portion suitable to fit the curve of pole 104. Thereby brace 116 can fit more tightly to the surface of pole 104. Arc 114 can peripherally curve around bended portion 102 (FIGS. 1, 3, 6 and 7).

Brace 116 can be placed on supporting body 100. In an interesting embodiment, brace 116 can form a cup shape or cylindrical shape with a hollowed portion therein. Brach 116 can have inner wall 122 to form passthrough 120. Brace 116 can have inner wall 122 and outer wall 124. Brace 116 can have a curved arc 114 configured to match the surface of pole 104. Brace 116 can optionally have an orientation indicator 112. Brace 116 can have outer wall 124. A benefit of brace 116 can be to apply a tightening force whereby brace 116 is tightened by nut 108 on threaded portion 110 of supporting body 100. Thereby, brace 116 can be pushed toward bended portion 102 to grip pole 104 between bended portion 102 and the arc 114 of brace 116. Brace 116 can be configured with nut 108 to tighten brace 116 along supporting body 100 toward the bended portion 102. Brace 116 can be configured to tighten against bended portion 102 to grasp pole 104. Brace 116 can be movable along threaded portion 110 on supporting body 100. Brace 116 can be rounded on an exposed edge. Brace 116 can have a concave portion capable of being configured to fit with an outer diameter of pole 104. Brace 116 can be configured to tighten upon or otherwise fit with an outer diameter of pole 104. Brace 116 can be hollow. Brace 116 can be flat, curved, cylindrical, or any combination thereof. Brace 116 can be formed into a bent plate. Brace 116 can have passthrough 120 coupled with supporting body 100 through the passthrough 120. Brace 116 can be closed against bended portion 102 along supporting body 100 via nut 108.

Thickened portion 118 can be on supporting body 100. Thickened portion 118 can be formed by a bulb or protrusion on supporting body 100. Thickened portion 118 can be adjacent to a pinch on supporting body 100. In an interesting embodiment, Thickened portion 118 can be formed by pinching supporting body 100 creating both thickening and thinning portions on supporting body 100. A benefit of thickened portion can be to prevent washer 106 and nut 108 from sliding off supporting body 100.

Passthrough 120 can be formed by inner wall 122 inside brace 116 through the cup to accommodate supporting body 100 through brace 116.

Inner wall 122 can form passthrough 120 to accommodate supporting body 100 through brace 116. In an interesting embodiment, inner wall 122 can be formed as a blocked, rectangular shape which can include a square with tapered edges to permit supporting body 100 to slidably insert while avoiding twisting or turning along anti-rotational portion 103 of supporting body 100.

Outer wall 124 can form the outer perimeter of brace 116. There can be an outer wall cavity formed by outer wall 124 peripheral to passthrough 120 as formed by inner wall 122. Brace 116 can be enclosed with a cover or otherwise formed to enclose brace distal from bended portion. Outer wall 124 can optionally have orientation indicator 112 visible from outside.

Curved end 126 (FIG. 3) can be formed on brace 116. Curved ends 126 can be formed at the outermost portions of arc 114. Plurality of curved ends 126 can be formed on arc 114 (FIGS. 1, 3, 4, 5, and 6). In a preferred embodiment, the plurality of curved ends 126 of arc 114 can be formed on brace 116 to terminate other than the direction of orientation indicator 112.

In an interesting embodiment, a pole step apparatus can have supporting body 100 with bended portion 102; washer 106 on supporting body 100 near bended portion 102; nut 108 on supporting body 100; washer 106 can be tightened with bended portion 102 via nut 108; orientation indicator 112 can be affixed to display on brace 116; supporting body 100 can be elongated greater than six inches; supporting body 100 can have grip surface 101 distal from bended portion 102; nut 108 can be on threaded portion 110; washer 106 can be configured with nut 108 to tighten against bended portion 106 to grasp pole 104; bended portion 102 can be formed by a 90-degree angle and can be substantially parallel to brace 116; threaded portion 110 can be on supporting body 100 and adjacent to washer 106 such that nut 108 tightens via threaded portion 110; and brace 116 can provide concave arc 114 capable of being configured to fit with an outer diameter of fiberglass utility pole 104.

A method of anchoring a cantilevered step to a fiberglass utility pole can provide the steps of: drilling an opening into a hollow fiberglass pole 104 to accommodate a supporting body 100 having bended portion 102 thereon; inserting bended portion 102 with supporting body 100 into the pole 104; fitting brace 116 via arc 114 to an outer surface of pole 104; tightening nut 108 on threaded portion 110 of supporting body 100 against brace 116 toward bended portion 102 to tightly adhere and anchor against an inner and an outer portion of pole 104; and simultaneously adhering brace 116 toward bended portion 102 to tightly adhere to pole 104 adjacent to the opening of the pole 104 (FIG. 7). Bended portion 102 can press against the inner wall of the pole 104 while the outer wall of pole 104 is pressed against by brace 116. Brace 116 can hold supporting body 100 via passthrough 120 while anchored to pole 104. A benefit thereby is to provide a step, or a series of steps, attached to a hollowed fiberglass pole.

CONCLUSION

In summary, the present invention provides a step apparatus for fiberglass utility poles.

The foregoing description of the preferred embodiments of the invention has been presented for the purposes of illustration and description. It is not intended to be exhaustive or to limit the invention to the precise form disclosed. Many modifications and variations are possible in light of the above teaching, it is intended that the scope of the invention are not, and need not be, limited by this detailed description, but by the claims and the equivalents to the claims which relate to the present invention. Use of punctuation and any articles "a" or "the" in reference to matter claimed shall be construed broadly to uphold the appended claims and equivalents thereto. This specification shall be construed broadly to uphold the claims and equivalents thereto, as set forth by the claims appended hereto.

What is claimed is:

1. A step apparatus for fiberglass utility poles comprising:

a unitary supporting body consisting of a bended portion, a grip surface distal to the bended portion, a threaded portion adjacent to the grip surface, and a non-cylindrical, anti-rotational portion located between the threaded portion and the bended portion;

a nut positioned on the threaded portion; and a brace positioned on the non-cylindrical, anti-rotational portion, the brace having an arcuate surface on one end thereof, wherein the bended portion of the supporting body is configured to be inserted into an opening in the pole and tightly adhered thereto by fitting the arcuate surface of the brace to an outer surface of the pole and tightening the nut towards the brace.

2. The apparatus of claim 1, wherein:

the nut is configured to rotatably tighten the brace toward the bended portion via the threaded portion of the supporting body.

3. The apparatus of claim 2, wherein:

a passthrough in the brace is formed by an inner wall in the brace.

4. The apparatus of claim 3, further comprising:

the inner wall is fitted to a portion of the supporting body that resists rotation wherein the non-cylindrical, anti-rotational portion is formed on the supporting body.

5. The apparatus of claim 4, wherein:

the supporting body slidably passes through the passthrough.

6. The apparatus of claim 5, wherein:

the bended portion is formed on the supporting body at a 90-degree angle.

7. The apparatus of claim 6, wherein:

the arcuate surface is formed on the brace adjacent to the bended portion.

8. The apparatus of claim 7, further comprising:

the brace and the supporting body are fitted to resist rotation by coupling the non-cylindrical, anti-rotational portion of the supporting body with the inner wall of the passthrough.

9. A method of anchoring a cantilevered step to a fiberglass utility pole, comprising:

(a) providing the step apparatus of claim 1;

(b) drilling an opening into a hollow said fiberglass pole;

(c) inserting the bended portion with the supporting body into the opening;

(d) fitting the brace via the arcuate surface to the outer surface of the pole;

(e) tightening the nut on the threaded portion of the supporting body; and (f) simultaneously adhering the brace toward the bended portion to tightly adhere the step apparatus to the pole adjacent to the opening.

10. The method of claim 9, further comprising:

(g) pressing against an inner wall of the pole via bended portion.

* * * * *